United States Patent
Sarma et al.

(10) Patent No.: US 12,081,995 B2
(45) Date of Patent: Sep. 3, 2024

(54) SHARING TRANSMISSION MEDIUMS IN WIFI-BLUETOOTH COMBINATION SYSTEMS

(71) Applicant: Cypress Semiconductor Corporation, San Jose, CA (US)

(72) Inventors: Munukutla Sandeep Sarma, Bangalore (IN); Raghavendra Kencharla, Bangalore (IN)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 18/233,813

(22) Filed: Aug. 14, 2023

(65) Prior Publication Data

US 2024/0040391 A1    Feb. 1, 2024

Related U.S. Application Data

(63) Continuation of application No. 17/341,154, filed on Jun. 7, 2021, now Pat. No. 11,743,736.

(51) Int. Cl.
| | |
|---|---|
| *H04W 4/00* | (2018.01) |
| *H04W 4/80* | (2018.01) |
| *H04W 12/08* | (2021.01) |
| *H04W 16/14* | (2009.01) |
| *H04W 84/12* | (2009.01) |

(52) U.S. Cl.
CPC ............ *H04W 16/14* (2013.01); *H04W 4/80* (2018.02); *H04W 12/08* (2013.01); *H04W 84/12* (2013.01)

(58) Field of Classification Search
CPC ....... H04W 16/14; H04W 4/80; H04W 12/08; H04W 84/12
USPC .......................................................... 370/329
See application file for complete search history.

(56) References Cited

U.S. PATENT DOCUMENTS

| | | | | |
|---|---|---|---|---|
| 11,380,008 | B2* | 7/2022 | Marsh ................ | G02B 27/0093 |
| 11,743,736 | B2* | 8/2023 | Sarma .................. | H04W 12/08 |
| | | | | 370/329 |
| 11,799,711 | B2* | 10/2023 | Ly .......................... | H04L 67/53 |
| 11,849,356 | B2* | 12/2023 | Feldman ............. | H04L 65/1104 |
| 2008/0279138 | A1* | 11/2008 | Gonikberg ............ | H04W 88/06 |
| | | | | 370/328 |
| 2008/0279162 | A1* | 11/2008 | Desai ................ | H04W 72/1215 |
| | | | | 370/338 |
| 2009/0081962 | A1* | 3/2009 | Sohrabi ............... | H04W 72/569 |
| | | | | 455/78 |
| 2010/0165973 | A1* | 7/2010 | Su ..................... | H04W 72/1215 |
| | | | | 370/345 |
| 2010/0316027 | A1* | 12/2010 | Rick ...................... | H04B 1/406 |
| | | | | 370/336 |
| 2013/0139222 | A1* | 5/2013 | Kirillin .................. | H04L 67/02 |
| | | | | 726/4 |
| 2014/0070946 | A1* | 3/2014 | Ambrefe, Jr. ......... | H04W 4/029 |
| | | | | 340/541 |

(Continued)

*Primary Examiner* — Marceau Milord

(57) ABSTRACT

The embodiments described herein are directed at techniques to sharing a transmission medium in a Bluetooth transceiver/WLAN transceiver combination device. A first device may receive a request from a second device to use the wireless transmission medium. The second device may also transmit timing data to the first device. The first device may determine a period of time to allow the second device to use the wireless transmission medium based on the timing data.

20 Claims, 6 Drawing Sheets

(56) References Cited

U.S. PATENT DOCUMENTS

| | | | |
|---|---|---|---|
| 2016/0029190 A1* | 1/2016 | Rattner | H04W 88/16 |
| | | | 455/414.4 |
| 2016/0174280 A1* | 6/2016 | Singh | H04W 76/15 |
| | | | 370/329 |
| 2017/0193818 A1* | 7/2017 | Helmy | H04L 12/282 |
| 2018/0026670 A1* | 1/2018 | Homchaudhuri | ............ |
| | | | H04W 72/0453 |
| | | | 370/329 |
| 2020/0105075 A1* | 4/2020 | Meadow | G07C 9/29 |
| 2021/0074106 A1* | 3/2021 | Meadow | G01S 5/0027 |

* cited by examiner

SHARING TRANSMISSION MEDIUMS IN WIFI-BLUETOOTH COMBINATION SYSTEMS

CROSS-REFERENCE TO RELATED APPLICATIONS

This application is a continuation of U.S. application Ser. No. 17/341,154, filed Jun. 7, 2021, which is incorporated by reference herein in its entirety.

TECHNICAL FIELD

The present disclosure relates generally to multi-communication protocol chips (e.g., combination Wi-Fi™ and Bluetooth™ systems), and more particularly to sharing transmission mediums in multi-communication protocol chips.

BACKGROUND

Various devices may include transceivers configured to transmit/receive data according to any of various communication protocols. For example, a transceiver can transmit/receive signals using the Wi-Fi™ protocol, the Bluetooth™ protocol, or the WiMAX™ protocol, among others. In some cases, multiple transceivers can be implemented in a single multi-protocol combination device and can share other system resources, such as transmission medium. For example, a single device can include a Bluetooth™ transceiver as well as a wireless local area network (WLAN) transceiver (operating with the Wi-Fi™ protocol, for example), which may both at least partially share a common wireless transmission medium (e.g., a radio frequency (RF) band, such as 2.4 gigahertz (GHz) band).

BRIEF DESCRIPTION OF THE DRAWINGS

The present embodiments are illustrated by way of example, and not of limitation, in the figures of the accompanying drawings.

DETAILED DESCRIPTION

Figure 1:
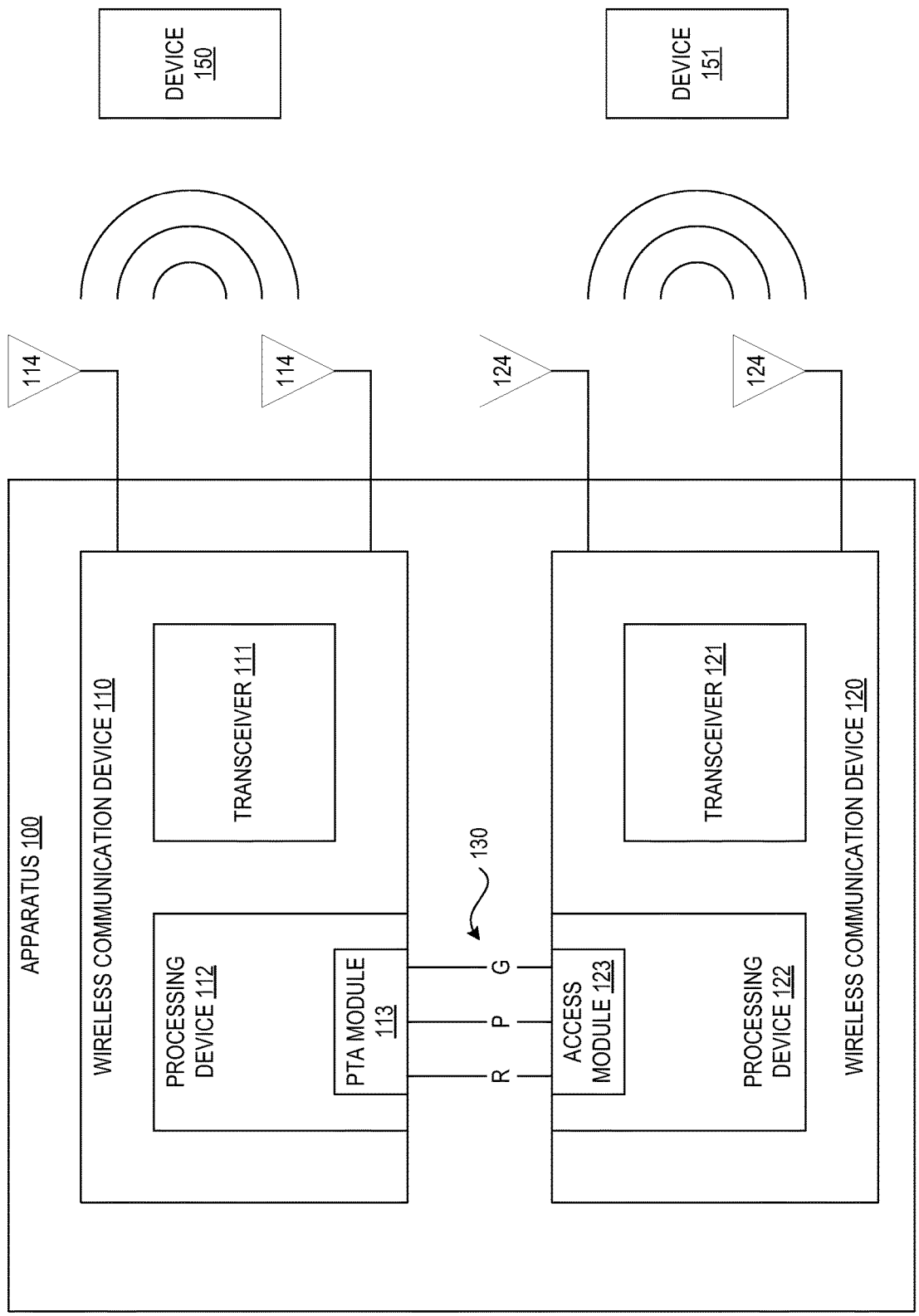
FIG. 1 is a block diagram illustrating an example apparatus, according to some embodiments of the present disclosure.

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

Many multi-protocol combination devices discussed above include both WLAN and BT transceivers/antennas, which are co-located and share the same spectrum in the 2.4 GHz ISM band. Due to this coexistence of WLAN and Bluetooth™ radios, and their sharing of the same band, simultaneous WLAN/Bluetooth™ traffic can create interference that degrades the performance of the WLAN transceiver. This interference may be severe in cases where the Bluetooth™ transceiver transmits a signal, while the WLAN transceiver is receiving a signal, resulting in an increase in in-band interference during WLAN reception, which can cause reception failure.

Some multi-protocol combination devices may utilize a time sharing operation such as time division multiplexing (TDM) between WLAN and Bluetooth™ transceivers using a coexistance (coex) arbitration mechanism to avoid mutual interference. Using TDM, the WLAN and Bluetooth™ transceivers may ensure that they are not transmitting or receiving at the same time as each other. An example coexistence mechanism may be a 3-wire interface that allows the WLAN and Bluetooth™ transceivers/devices to coordinate with each other regarding when to transmit/receive data. However, current coex arbitration mechanisms, such as 3-wire, do not allow a device to indicate how long the device will use a wireless transmission medium. Thus, a first wireless communication device (e.g., a master device) may allocate too much time (e.g. overallocate) or may allocated too little time (e.g., underallocate) for a second wireless communication device (e.g., a slave device) to use the wireless transmission medium. Overallocating and/or underallocating may reduce the throughput of data between devices. Overallocating and/or underallocating may also result in less efficient usage of the wireless transmission medium. For example, overallocating the wireless transmission medium for wireless communication device may result in wasted time where the wireless communication device does not use the wireless transmission medium for the fully allocated time. Underallocating the wireless transmission medium may cause degradation in throughput if other peer devices attempt to communicate with a first wireless device while the second wireless device is still using the wireless transmission medium past the allocated time.

The embodiments described herein are directed at techniques to share a wireless transmission medium between two wireless communication devices. Timing data may be transmitted between a first wireless communication device (that manages the use/access for the wireless transmission medium) and a wireless communication second device requesting use of the wireless transmission medium. The timing data may be transmitted using a coex arbitration mechanism, such as a 3-wire interface. The second wireless communication device may transmit the timing data that may indicate and/or may be used to determine (e.g., calculate) how long the second device will use the wireless transmission medium. The timing data may allow the first wireless communication device to allocate, assign, etc., the second wireless communication device a time period to use the wireless transmission medium that is more efficient and/or that maintains network/data throughput.

FIG. 1 is a block diagram illustrating an example apparatus 100, according to some embodiments of the present disclosure. The apparatus 100 may be a multi-protocol combination communication device. For example, the apparatus 100 may be a communication device that uses multiple wireless communication protocols, such as Bluetooth™, Wi-Fi™, Zigbee™, Z-wave™, Long Term Evolution (LTE), etc. In one embodiment, the apparatus 100 may be a multi-protocol combination communication chip (e.g., a processing, a circuit, a field programmable gate array (FPGA), an application specific integrated circuit (ASIC), etc.) that combines a first wireless communication device 110 operating using a first communication protocol (e.g., Wi-Fi™) and a second wireless communication device 120 using a second communication protocol (e.g., Bluetooth™, Zigbee™, Z-wave™, LTE, etc.). For example, the apparatus 100 may be a WLAN and BT combination chip, in accordance with some embodiments of the present disclosure. The apparatus 100 may communicate data with devices 150 and 151 (e.g., separate computing devices, such as another wireless communication device, a laptop computer, a table computer, a smart phone, etc.) via a wireless transmission medium. For example, wireless communication device 110 may communicate data with device 150 using a first wireless communication protocol (e.g., Wi-Fi™) via the wireless transmission medium, and wireless communication device 120 may communicate data with device 151 using a second wireless communication protocol (e.g., Bluetooth™ Zigbee™, Z-wave™, LTE,) via the wireless transmission medium.

The apparatus 100 includes a wireless communication device 110 and a wireless communication device 120. In one embodiment, the apparatus 100 may be a chip, a circuit, a processing device, etc. Each of the wireless communication devices 110 and 120 may be different portions of the chip, circuit, or processing device. In other embodiments, each of the wireless communication devices 110 and 120 may be separate chips, circuits, processing devices, etc. The wireless communication device 110 may be referred to as a master device, a primary device, etc. The wireless communication device 120 may be referred to as a slave device, a secondary device, etc.

In one embodiment, the wireless communication devices 110 and 120 may share a wireless transmission medium (e.g., a 2.4 gigahertz (GHz) band, a RF frequency/band, a range of RF frequencies/bands, etc.). For example, both the wireless communication devices 110 and 120 may use communication protocols that use the same RF frequency (e.g., 2.4 GHz).

In one embodiment, the wireless communication devices 110 and 120 are coupled to each other via a 3-wire interface 130. The 3-wire interface 130 may allow the wireless communication devices 110 and 120 to coordinate the use/sharing of the wireless transmission medium, as discussed in more detail below. The 3-wire interface may include a request line R, a priority line P, and a grant line G.

The wireless communication devices 110 and 120 may utilize a time sharing scheme such as time division multiplexing (TDM) using the 3-wire interface (e.g., a coex arbitration mechanism) to share access to the wireless transmission medium (e.g., to avoid mutual interference). Using TDM, the wireless communication devices 110 and 120 (e.g., transceivers 111 and 121) may ensure that they are not transmitting or receiving at the same time as each other (which helps avoid RF interference). Generally, 3-wire interfaces do not allow a device to indicate how long the device will use a wireless transmission medium, as discussed above. This may result in overallocating/overcommitting (e.g., granting too much time to use the wireless transmission medium) or underallocating/undercommitting (e.g., granting too little time to use the wireless transmission medium). Overallocating and/or underallocating may reduce the throughput of data between wireless communication devices and/or may result in less efficient usage of the wireless transmission medium.

The wireless communication device 120 includes a processing device 122 and a transceiver 121. The transceiver 121 may include one or more receive chains, and each receive chain may include signal processing components (e.g., a low noise amplifier, a mixer, a variable gain amplifier, and a low pass filter, etc.). The transceiver 121 may be coupled to one or more antennas 124 through which the transceiver 121 may send and/or receive signals (e.g., communicate packets, frames, or other data). The transceiver 121 may be coupled to the one or more antennas 124 via one or more receive chains. For example, each receive chain may be coupled to an antenna 124. Each receive chain may also be coupled to an analog to digital converter (ADC) which it may use to digitize received signals and output the digitized signals to a digital demodulator (also referred to as a digital detector) which may extract any information content from the received digitized signals (e.g., by extracting the information bearing signal from a carrier wave).

The processing device 122 includes an access module 123. Access module 123 may be hardware (e.g., one or more circuits, a chip, a portion of a chip, etc.), software, firmware, or a combination thereof. As illustrated in FIG. 1, the wireless communication device 120 is coupled to the wireless communication device 110 via a 3-wire interface 130. For example, the access module 123 may be coupled to the packet traffic arbiter (PTA) module 113 of the wireless communication device 110 via the 3-wire interface 130. The access module 123 may request access to the wireless transmission medium (e.g., a 2.4 gigahertz (GHz) band/frequency, an RF band/frequencies, a block of RF bands/frequencies, etc.) from the wireless communication device 110 and may provide the wireless communication device 110 with timing data, as discussed in more detail below.

In one embodiment, the access module 123 may transmit a request (e.g., a packet, a message, a frame, etc.) to the wireless communication device 110 (e.g., to PTA module 113) to use the wireless transmission medium to communicate data (e.g., to transmit and/or receive data). For example, the access module 123 may determine that the wireless communication device 120 wants to transmit and/or receive data using the wireless transmission medium. The access module 123 may transmit a request to use the wireless transmission medium to the wireless communication device 110 via the 3-wire interface 130. For example, the access module 123 may transmit the request via the request line R of the 3-wire interface 130.

In one embodiment, the priority line P may be used to indicate that the data communicated (e.g., transmitted and/or received) by the wireless communication device 120 is high priority or low priority. For example, when a high signal or pulse is transmitted on the priority line P by the wireless communication device 120, this may indicate that the data that is being communicated is high priority. In another example, when a low signal or pulse is transmitted on the priority line P by the wireless communication device 120, this may indicate that the data being communicated is low priority.

In one embodiment, the access module 123 may also transmit timing data to the wireless communication device 110 via the 3-wire interface 130. For example, the access module 123 may transmit the timing data via the priority line P of the 3-wire interface 130. For example, the access module 120 may transmit pre-defined pulses via the priority line P of the 3-wire interface 130, as discussed in more detail below. In other embodiments, the timing data may be transmitted as part of the request (to use the wireless transmission medium), rather than separate from the request.

In one embodiment, the timing data may indicate how long the wireless communication device 120 wants to use the wireless transmission medium. For example, the timing data may indicate a length, period, or amount of time that the wireless communication device 120 wants to transmit data (e.g., 10 milliseconds (ms), 25 ms, or some other appropriated period of time). In another embodiment, the timing data may indicate the amount of data the wireless communication device 120 wants to communicate (e.g., transmit and/or receive) via the wireless transmission medium. For example, the timing data may indicate that the wireless communication device 120 has 2 kilobytes (KB), 500 KB, 1 megabyte (MB), or some other appropriate amount of data to transmit/receive.

In other embodiments, the timing data may be any data and/or information that may be used by the wireless communication device 110 (e.g., the PTA module 113) to determine how long the wireless communication device 120 wants to use the wireless transmission medium. For example, the timing data may indicate whether a frame/packet is acknowledged or non-acknowledged, whether the frame is a long frame a short frame, a periodicity at which the wireless communication device 120 will communicate data (e.g., every 100 ms, every 500 ms), a schedule at which the wireless communication device 120 will communicate data, etc.

In one embodiment, the timing data may be transmitted to the wireless communication device 110 (e.g., to the PTA module 113) using a series of pre-defined pulses. For example, high signals/pulses (e.g., a "1") and/or low signals/pulses (e.g., a "0") may be transmitted to the wireless communication device 110 for different periods of time. These periods of time when the high signal/pulse is transmitted may be the pre-defined pulses. In one embodiment, the pre-defined pulses may indicate a bit string. For example, a high signal/pulse that lasts for 50 ms (or some other period of time) may indicate the value "1" and a low signal/pulse that lasts for 50 ms (or some other period of time) may indicate the value "0."

In one embodiment the access module 123 may receive an authorization to use the wireless transmission medium. For example, the access module 123 may receive a message, frame, packet, bit string, pulses, etc., from the wireless communication device 110 (e.g., from the PTA module 113) indicating that the wireless communication device 120 is allowed to use the wireless transmission medium (e.g., to communicate, transmit, and/or receive data). The authorization may be received via the grant line G of the 3-wire interface 130. For example, if the wireless communication device 110 transmits a high signal or pulse to the wireless communication device 120 via the grant line G, this may indicate that the wireless communication device 120 is allowed, authorized, etc., to use the wireless transmission medium. If the wireless communication device 110 transmits a low signal or pulse to the wireless communication device 120 via the grant line G, this may indicate that the wireless communication device 120 is not allowed, not authorized, etc., to use the wireless transmission medium.

In one embodiment, the authorization may indicate a time and/or a time period when the wireless communication device 120 can start using the wireless transmission medium to communicate data (e.g., to transmit/receive data). For example, the authorization may include a timestamp that indicates when the wireless communication device 120 can start using the wireless transmission medium. In another example, the authorization may include a time period (e.g., a starting time/timestamp and an ending time/timestamp) that indicates how long the wireless communication device 120 may use the wireless transmission medium.

In one embodiment, the access module 123 may indicate when the wireless communication device 120 is communicating data (e.g., using the wireless transmission medium), via a request line R of the 3-wire interface 130. For example, while the wireless communication device 120 is transmitting data, the access module 123 may continually/periodically transmit a signal, pulse, messages, etc., to the wireless communication device 110 via the request line R. In another embodiment, the access module 123 may indicate when the wireless communication device 120 has finished communicating data (e.g., finished using the wireless transmission medium). For example, once the wireless communication device 120 is finished communicating data, the access module 123 may stop transmitting a signal, pulse, messages, etc., to the wireless communication device 110 via the request line R.

The wireless communication device 110 includes a processing device 112 and a transceiver 111. The transceiver 111 may also include one or more receive chains, and each receive chain may include signal processing components. The transceiver 111 may be coupled to one or more antennas 114 through which the transceiver 111 may send and/or receive signals. The transceiver 111 may be coupled to the one or more antennas 114 via one or more receive chains. Each receive chain may also be coupled to an analog to digital converter (ADC) which it may use to digitize received signals and output the digitized signals to a digital demodulator which may extract any information content from the received digitized signals.

The processing device 112 includes a PTA module 113. PTA module 113 may be hardware (e.g., one or more circuits, a chip, a portion of a chip, etc.), software, firmware, or a combination thereof. As illustrated in FIG. 1, the wireless communication device 110 is coupled to the wireless communication device 120 via the 3-wire interface 130 (e.g., via the request line R, the priority line P, and the grant line G). The PTA module 113 may control, coordinate, manage, organize, etc., shared access to the wireless transmission medium (e.g., a 2.4 gigahertz (GHz) band/frequency, an RF band/frequencies, a block of RF bands/frequencies, etc.). For example, the PTA module 113 may coordinate the different times that the wireless communication devices 110 and 120 can use the wireless transmission medium, to allow the wireless communication devices 110 and 120 share the wireless transmission medium, as discussed in more detail below.

In one embodiment, the PTA module 113 may receive a request to use the wireless transmission medium from the wireless communication device 120 (e.g., from the access module 123). As discussed above, the wireless communication devices 110 and 120 share the wireless transmission medium (e.g., both the wireless communication devices 110 and 120 communicate data using the wireless transmission medium). Because the wireless communication device 110 may be a master or primary device, the wireless communication device 110 may control, coordinate, manage, organize, etc., access to or use of the wireless transmission medium. Thus, the wireless communication device 120 may request permission or authorization before communicating data via the wireless transmission medium. The request to use the wireless transmission medium may be received via the request line R of the 3-wire interface 130.

In one embodiment, the PTA module 113 may receive timing data from the wireless communication device 120 (e.g., from the access module 123) via the priority line P of the 3-wire interface 130. As discussed above, the timing data may indicate the amount of time and/or the amount of data that the wireless communication device 120 has to communicate using the wireless transmission medium. In some embodiments, the timing data may include data or information that may be used to determine how long the wireless communication device 120 wants to user the wireless transmission medium (e.g., number of frames, size of frames, periodicity of communicating data, a schedule for communicating data, etc.).

In one embodiment, the PTA module 113 may determine a time period to allow the wireless communication device 120 to use the wireless transmission medium, based on the request and/or timing data received from the wireless communication device 120. For example, the timing data may indicate an amount of time or a schedule (e.g., one or more time periods) that the wireless communication device 120 wants to transmit data. The PTA module 113 may determine one or more time periods that the wireless communication device 120 may be allowed to communicate data using the wireless transmission medium. For example, based on the amount of data that the wireless communication device 110 wants to transmit, the PTA module 113 may determine one or more times (e.g., a schedule of time) when the wireless communication device 120 is allowed to communicate data. The one or more times may be times when the wireless communication device 110 does not have data to communicate or is able to pause/hold communicating data.

In one embodiment, the PTA module 113 may transmit an authorization to use the wireless transmission medium to the wireless communication device 120 (e.g., to the access module 123). For example, after determining one or more time periods for the wireless communication device 120 to communicate data, the PTA module 113 may transmit the authorization to the wireless communication device 120. The authorization may be transmitted via the grant line G of the 3-wire interface 130. As discussed above, the authorization may indicate a time and/or a time period when the wireless communication device 120 can start using the wireless transmission medium to communicate data (e.g., to transmit/receive data).

As discussed above, the wireless communication device 120 (e.g., the access module 123) may indicate when the wireless communication device 120 is communicating data (e.g., using the wireless transmission medium), via a request line R of the 3-wire interface 130. For example, the wireless communication device 110 may continually/periodically receive a signal, pulse, messages, etc. (from the wireless communication device 120 via the request line R) while the wireless communication device 120 is communicating data. The PTA module 113 may stop may stop receiving the signal, pulse, messages, etc. when the wireless communication device 120 is done communicating data.

In one embodiment, the PTA module 113 (and/or the wireless communication device 110) my refrain from using the wireless transmission medium while the wireless communication device 120 communicates data (e.g., transmits/receives data, is using the wireless transmission medium, etc.). For example, while the PTA module 113 receives signals, pulses, messages, etc. from the wireless communication device 120 via the request line R, the PTA module 113 (and/or the wireless communication device 110) may not communicate data (because the signals, pulses, etc. indicate that the wireless communication device 120 is still transmitting/receiving data).

In one embodiment, the PTA module 113 may transmit a message (e.g., a packet, frame or other data) to the device 150 when the PTA module 113 determines the times/time periods to allow the wireless communication device 120 to use the wireless transmission medium. The message may indicate to the device 150 that the device 150 is to stop transmitting data (e.g., should stop transmitting data) to the apparatus 100 and/or the wireless communication device 110. For example, the message may indicate that the device 150 is to stop transmitting data to the wireless communication device 110 while the wireless communication device 120 is using the wireless transmission medium. The message may be referred to as a clear to send (CTS) message.

In one embodiment, the CTS message may indicate to the device 150 that the wireless communication device 110 will transmit data to the device 150. The CTS message may be sent to the device 150 even if the wireless communication device 110 does not have data to transmit to the device 150. The CTS message may be used to cause the device 150 to stop transmitting data which may allow the wireless communication device 120 to communicate data with other devices more quickly and/or efficiently.

Figure 2:
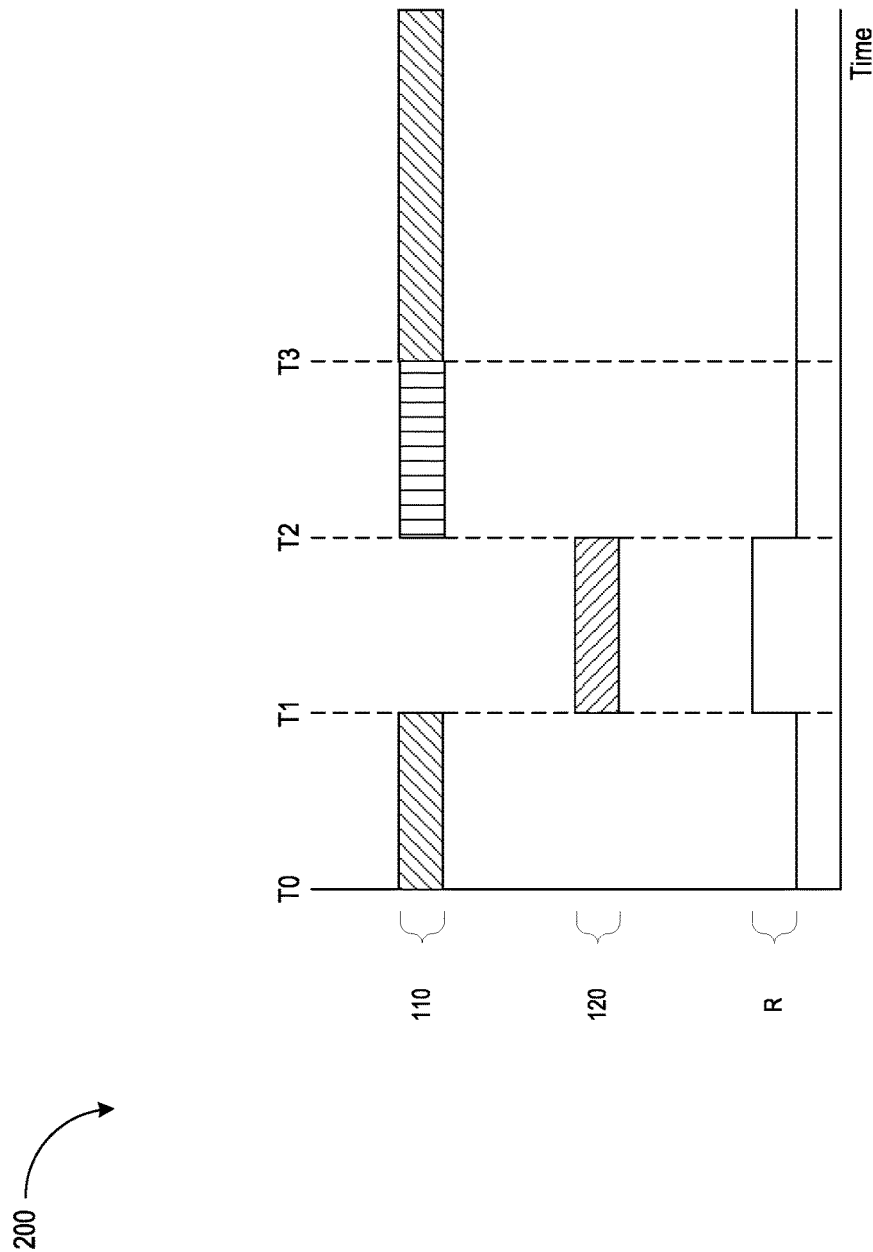
FIG. 2 is a graph illustrating example time periods, according to some embodiments of the disclosure.
Figure 3:
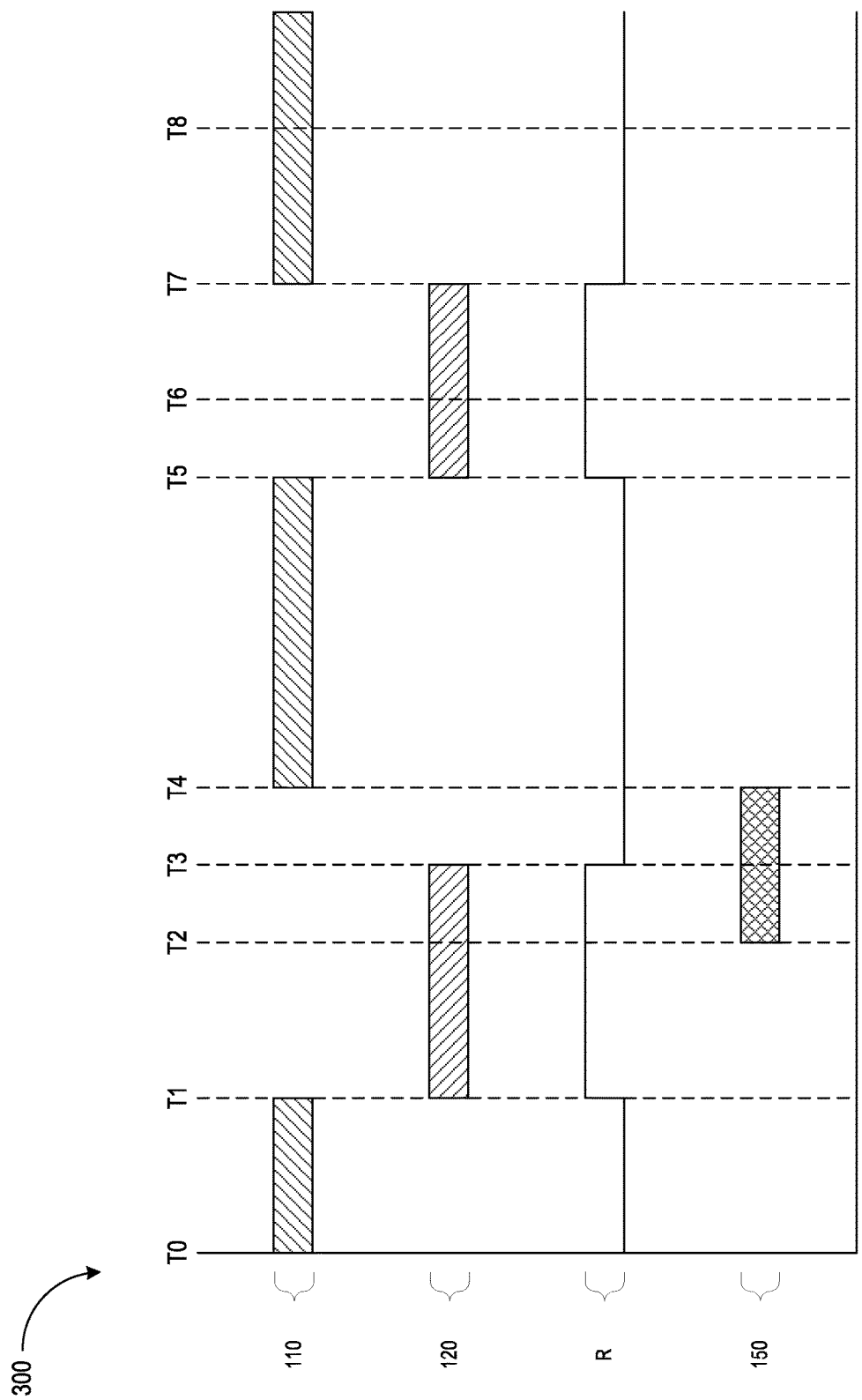
FIG. 3 is a graph illustrating example time periods, according to some embodiments of the disclosure.

As discussed above, timing data may be transmitted by the wireless communication device 120. The timing data may be transmitted via the 3-wire interface 130. The timing data may be used to indicate and/or determine how long the second device will use the wireless transmission medium. The timing data may allow the wireless communication device 110 to allocate, assign, grant, etc., the wireless communication device 120 a time period to use the wireless transmission medium that is more efficient and/or that maintains network/data throughput. For example, the timing data may allow the wireless communication devices 110 and 120 to reduce the amount of time where the wireless transmission medium is not used (as illustrated in FIG. 2). In another example, the timing data may allow the wireless communication devices 110 and 120 to reduce degradation in network throughput (as illustrated in FIG. 3).

FIG. 2 is a graph 200 illustrating example time periods, according to some embodiments of the disclosure. The graph 200 indicates time along the X-axis and indicates wireless communication device 110, wireless communication device 120, and the request line R (of a 3-wire interface) along the Y-axis.

As illustrated in FIG. 2, the wireless communication device 110 starts communicating data from time T0 to T1. The wireless communication device 120 allows (e.g., authorizes) the wireless communication device 120 to transmit data at time T1. The wireless communication device 120 has enough data to transmit from time T1 to time T2. The wireless communication device 120 may transmit a high signal/pulse on the request line R during time T1 to T2 (to indicate that the wireless communication device 120 is transmitting data). In one embodiment, the wireless communication device 110 may overprotect or overcommit the wireless transmission medium. For example, the wireless communication device 110 may allow the wireless communication device 120 more time than wireless communication device 120 needs to transmit data via the wireless transmission medium (e.g., from time T1 to T3). Thus, the time between T2 and T3 may be wasted, because that time has been allocated to the wireless communication device 120 even though it does not have data to communicate.

However, the wireless communication device 120 may transmit timing data to the wireless communication device 110, as discussed above. The timing data may indicate that the wireless communication time will stop transmitting data at time T2. Based on this timing data, the wireless communication device 110 may resume communicating data (using the wireless transmission medium) at time T2 (rather than at time T3 if timing data was not provided). This allows the wireless communication devices 110 and 120 to more efficiently use the wireless transmission medium.

FIG. 3 is a graph 300 illustrating example time periods, according to some embodiments of the disclosure. The graph 300 indicates time along the X-axis and indicates wireless communication device 110, wireless communication device 120, the request line R (of a 3-wire interface), and device 150 along the Y-axis.

As illustrated in FIG. 2, the wireless communication device 110 starts communicating data from time T0 to T1. The wireless communication device 120 allows (e.g., authorizes) the wireless communication device 120 to transmit data at time T1. The wireless communication device 120 has enough data to transmit from time T1 to time T3. The wireless communication device 120 may transmit a high signal/pulse on the request line R during time T1 to T3 (to indicate that the wireless communication device 120 is transmitting data). The wireless communication device 110 may transmit a message (e.g., a CTS message) to the device 150 indicating that the device 150 is to stop transmitting data to the wireless communication device 110 until time T2.

In one embodiment, the wireless communication device 110 may underprotect or undercommit the wireless transmission medium. For example, the wireless communication device 110 may not allow the wireless communication device 120 enough time to transmit data via the wireless transmission medium. The wireless communication device 110 will refrain from transmitting data while the request line R is high. Thus, even though the wireless communication device 110 originally allocated time T1 to T2 for the wireless communication device 120, the wireless communication device 120 will continue to transmit data until time T3. The device 150 (e.g., another wireless device) may start transmitting data to the wireless communication device 110. The wireless communication device 110 is unable to receive the data (and/or acknowledge the data) because the wireless communication device 120 is still transmitting data. This may cause the device 150 to change the data rate of the communications between the device 150 and the wireless communication device 110. For example, the device 150 may change the modulation coding scheme (MCS) or the MCS index (that is used by the device 150 and the wireless communication device 110) to a slower data rate.

However, the wireless communication device 120 may transmit timing data to the wireless communication device 110, as discussed above. The timing data may indicate that the wireless communication time will not stop transmitting data until time T3. Based on this timing data, the wireless communication device 110 may indicate to the device 150 that the device 150 is to stop transmitting data (e.g., should stop transmitting data) until time T3 via the CTS message. This may help prevent the device 150 from changing the MCS index, because the device 150 will be able to communicate with wireless communication device 110 at time T3 as expected, rather than trying to communicate at time T2.

FIG. 3 further illustrates another example of underprotecting or undercommitting the wireless transmission medium. For example, the wireless communication device 110 may allow the wireless communication device 120 between time T5 and T6 to transmit data. However, the wireless communication device 120 may have more data to transmit than can be transmitted during time T5 to T6. The wireless communication device 110 will refrain from transmitting data while the request line R is high. Thus, even though the wireless communication device 110 originally allocated time T5 to T6 for the wireless communication device 120, the wireless communication device 120 will continue to transmit data until time T7. The device 150 may be waiting for the wireless communication device 110 to transmit data at time T6. The wireless communication device 110 is unable to transmit the data (and/or acknowledge the data) because the wireless communication device 120 is still transmitting data. This may cause the device 150 to change power modes (e.g., transition to a lower power mode, a sleep mode, etc.) because the device 150 may assume that there is no data to receive. The device 150 may not transition back to a normal power mode until time T8 even though the wireless communication device 110 has started transmitting data at time T7. This may cause data to be retransmitted and may also decrease the throughput of the data that is transmitted by the wireless communication device 110.

However, the wireless communication device 120 may transmit timing data to the wireless communication device 110, as discussed above. The timing data may indicate that the wireless communication time will not stop transmitting data until time T7. Based on this timing data, the wireless communication device 110 may indicate to the device 150 that the wireless communication device 110 will not transmit data until time T7, via a CTS message. This may help prevent the device 150 from transitioning to a lower power mode and may allow the device 150 to start receiving data from the wireless communication device at time T7, instead of at time T8.

Figure 4:
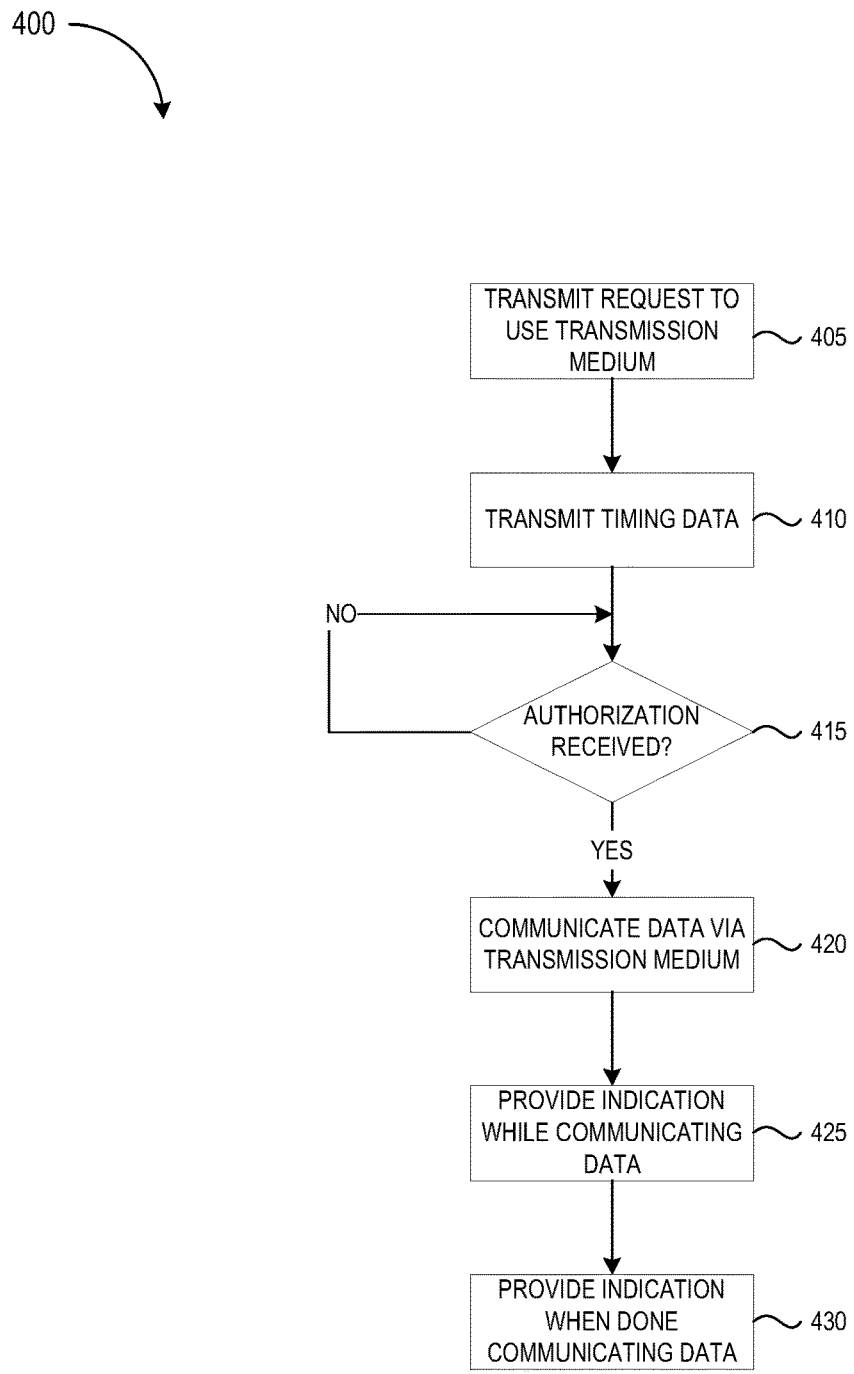
FIG. 4 is a flow diagram illustrating a method for sharing a wireless transmission medium, according to some embodiments of the present disclosure.

FIG. 4 is a flow diagram illustrating a method 400 for sharing a wireless transmission medium, according to some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 400 may be performed by one or more of a wireless communication device (e.g., wireless communication device 120), a processing device (e.g., processing device 122), and an access module (e.g., access module 123).

At block 405, the method 400 may transmit a request to use a transmission medium (e.g., a wireless transmission medium). The request may be transmitted to another wireless communication device via a request line R of a 3-wire interface. At block 410, the method 400 may also transmit timing data to the other wireless communication device. The timing data may indicate how long the wireless communication device wants to use the wireless transmission medium.

At block 415, the method 400 may determine whether an authorization was received from the other wireless communication device. If an authorization was not received, the method 400 may proceed back to block 415. If an authorization was received, the method 400 may communicate data (e.g., transmit and/or receive data) via the wireless transmission medium at block 420. At block 425, the method 400 may optionally provide an indication while communicating data via the wireless transmission medium (e.g., via a request line of the 3-wire interface). At block 430, the method 400 may optionally provide an indication when the wireless communication device is done communicating data.

Figure 5:
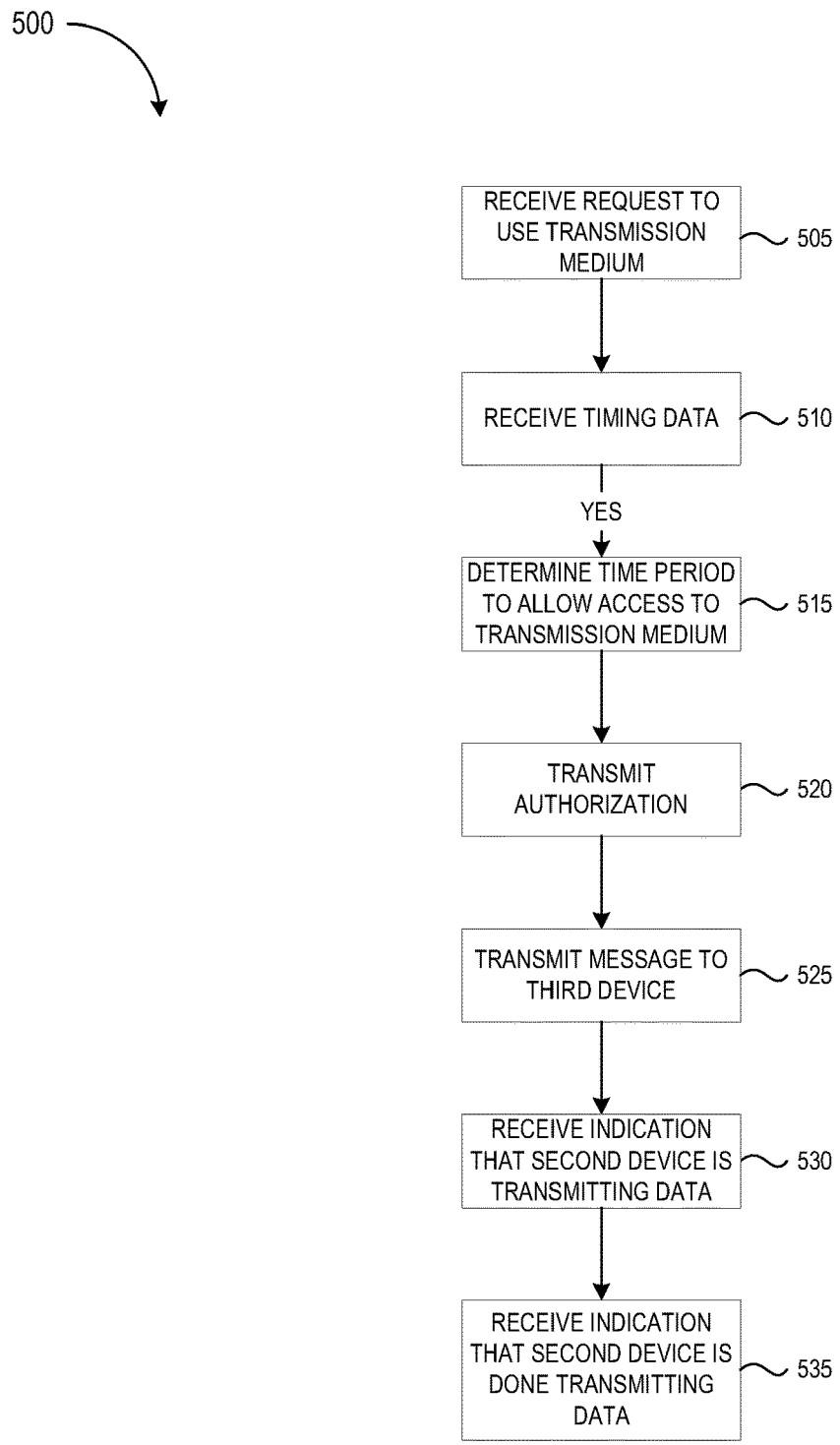
FIG. 5 is a flow diagram illustrating a method for sharing a wireless transmission medium, according to some embodiments of the present disclosure.

FIG. 5 is a flow diagram illustrating a method 500 for sharing a wireless transmission medium, according to some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 500 may be performed by one or more of a wireless communication device (e.g., wireless communication device 110), a processing device (e.g., processing device 112), and a PTA module (e.g., PTA module 113).

At block 505, the method 500 may receive a request to use a transmission medium (e.g., a wireless transmission medium) from a second wireless communication device. The request may be received via a request line R of a 3-wire interface. At block 510, the method 500 may also receive timing data from the second wireless communication device. The timing data may indicate how long the second wireless communication device wants to use the wireless transmission medium.

At block 515, the method 500 may determine a time period (e.g., an amount of time and/or starting time) to allow the second wireless communication device to use the wireless transmission medium, based on the timing data. The method may transmit an authorization to the second wireless communication device at block 520. The authorization may indicate when the second wireless communication device can use the wireless transmission medium and for how long. At block 525, the method 500 may optionally transmit a message to a third device (e.g., a CTS message) to indicate that the third device is to stop transmitting data.

At block 530, the method 500 may optionally receive an indication (e.g., pulses, signals, etc.) that the second wireless communication device is transmitting data. For example, the wireless communication device may continually receive a high signal/pulse from the second wireless communication device while the second wireless communication device is transmitting data. At block 535, the method 500 may optionally receive an indication that the second wireless communication device is done transmitting data. For example, the wireless communication device may stop receiving a high signal/pulse when the second wireless communication device finishes transmitting data.

Figure 6:
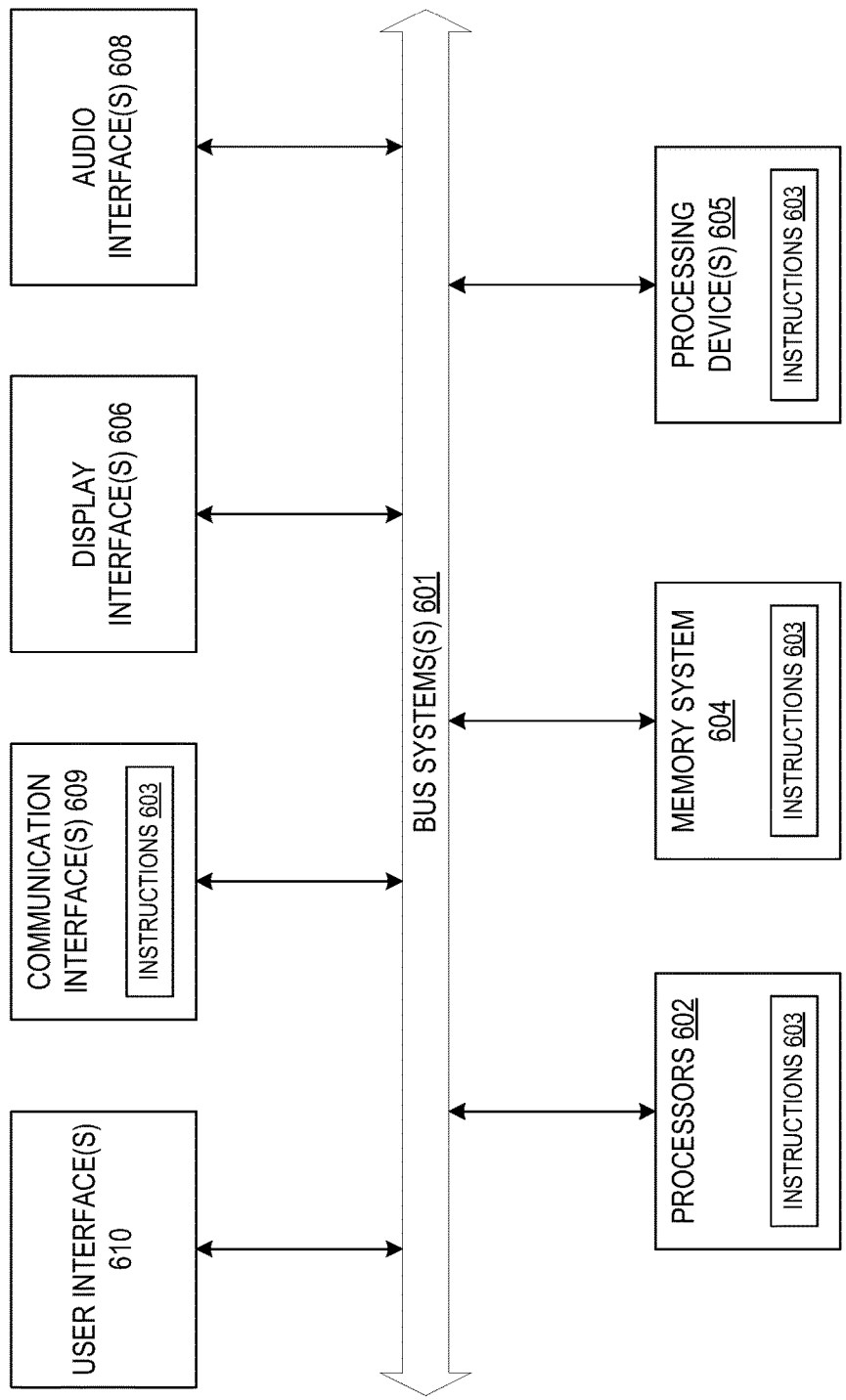
FIG. 6 illustrates an embodiment of a communication device, according to some embodiments of the present disclosure.

FIG. 6 is a block diagram illustrating a communication device 600, in accordance with some embodiments of the present disclosure. The communication device 600 may fully or partially include and/or operate the example embodiments of the apparatus 100 or portions thereof as described with respect to FIGS. 1-5. The communication device 600 may be in the form of a computer system within which sets of instructions may be executed to cause the communication device 600 to perform any one or more of the methodologies discussed herein. The communication device 600 may operate as a standalone device or may be connected (e.g., networked) to other machines. In a networked deployment, the communication device 600 may operate in the capacity of a server or a client machine in server-client network environment, or as a peer machine in a P2P (or distributed) network environment.

The communication device 600 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single communication device 600 is illustrated, the term "device" shall also be taken to include any collection of machines that individually or jointly execute a set (or multiple sets) of instructions to perform any one or more of the methodologies discussed herein.

The communication device 600 is shown to include processor(s) 602. In embodiments, the communication device 600 and/or processors(s) 602 may include processing device(s) 605 such as a System on a Chip processing device, developed by Cypress Semiconductor Corporation, San Jose, Calif. Alternatively, the communication device 600 may include one or more other processing devices known by those of ordinary skill in the art, such as a microprocessor or central processing unit, an application processor, a host controller, a controller, special-purpose processor, digital signal processor (DSP), an application specific integrated circuit (ASIC), a field programmable gate array (FPGA), or the like. Bus system 601 may include a communication block (not shown) to communicate with an internal or external component, such as an embedded controller or an application processor, via communication interfaces(s) 609 and/or bus system 601.

Components of the communication device 600 may reside on a common carrier substrate such as, for example, an IC die substrate, a multi-chip module substrate, or the like. Alternatively, components of the communication device 600 may be one or more separate ICs and/or discrete components.

The memory system 604 may include volatile memory and/or non-volatile memory which may communicate with one another via the bus system 601. The memory system 604 may include, for example, random access memory (RAM) and program flash. RAM may be static RAM (SRAM), and program flash may be a non-volatile storage, which may be used to store firmware (e.g., control algorithms executable by processor(s) 602 to implement operations described herein). The memory system 604 may include instructions 603 that when executed perform the methods described herein. Portions of the memory system 604 may be dynamically allocated to provide caching, buffering, and/or other memory based functionalities.

The memory system 604 may include a drive unit providing a machine-readable medium on which may be stored one or more sets of instructions 603 (e.g., software) embodying any one or more of the methodologies or functions described herein. The instructions 603 may also reside, completely or at least partially, within the other memory devices of the memory system 604 and/or within the processor(s) 602 during execution thereof by the communication device 600, which in some embodiments, constitutes machine-readable media. The instructions 603 may further be transmitted or received over a network via the communication interfaces(s) 609. The communication interface(s) 609 may be where the apparatus 100 discussed herein is implemented and/or located.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The communication device 600 is further shown to include display interface(s) 606 (e.g., a liquid crystal display (LCD), touchscreen, a cathode ray tube (CRT), and software and hardware support for display technologies), audio interface(s) 608 (e.g., microphones, speakers and software and hardware support for microphone input/output and speaker input/output). The communication device 600 is also shown to include user interface(s) 610 (e.g., keyboard, buttons, switches, touchpad, touchscreens, and software and hardware support for user interfaces).

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "detecting," "comparing," "resetting," "adding," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. A method, comprising:
receiving timing data at a first wireless communication device from a second wireless communication device, wherein the timing data that indicates an amount of data that the second wireless communication device is requesting to communicate to a third wireless communication device via a wireless transmission medium shared between the first wireless communication device and the second wireless communication device;
determining, by a processing device, a time period to allow the second wireless communication device to use the wireless transmission medium based on the amount of data that the second wireless communication device is requesting to communicate; and
transmitting from the first wireless communication device to the second wireless communication device an authorization to use the wireless transmission medium during the time period.

2. The method of claim 1, further comprising:
transmitting, by the first wireless communication device, a message to a fourth wireless communication device that indicates to the fourth wireless communication device to not transmit data to the first wireless communication device during the time period.

3. The method of claim 2, further comprising:
extracting, by the first wireless communication device, a transmit stop time from the timing data that indicates a point in time that the second wireless communication device will stop transmitting data; and
wherein the message to the fourth wireless communication device indicates to the fourth wireless communication device to not transmit data to the first wireless communication device after the transmit stop time.

4. The method of claim 3, further comprising:
transmitting another message to the fourth wireless communication device that indicates to the fourth wireless communication device that the first wireless communication device will not transmit data to the fourth wireless communication device until after the transmit stop time.

5. The method of claim 1, further comprising:
identifying a time at which the first wireless communication device can pause communicating data over the wireless transmission medium; and
determining the time period based on the time at which the first wireless communication device can pause communicating data over the wireless transmission medium.

6. The method of claim 1, further comprising:
receiving a first indication at the first wireless communication device from the second wireless communication device that the second wireless communication device is using the wireless transmission medium;
receiving a second indication at the first wireless communication device from the second wireless communication device that the second wireless communication device has stopped using the wireless transmission medium; and
in response to receiving the second indication, transmitting data by the first wireless communication device over the wireless transmission medium.

7. The method of claim 1, wherein the amount of data corresponds to one or more frames of data, and wherein the timing data comprises an indication of whether the one or more frames of data are acknowledged, an indication of whether the one or more frames of data correspond to a long frame a short frame, and a periodicity at which the second wireless communication device will communicate the one or more frames of data.

8. A system comprising:
a processing device;
a first wireless communication device comprising the processing device;
a second wireless communication device; and
a memory to store instructions that, when executed by the processing device cause the processing device to:
receive timing data at the first wireless communication device from the second wireless communication device, wherein the timing data that indicates an amount of data that the second wireless communication device is requesting to communicate to a third wireless communication device via a wireless transmission medium shared between the first wireless communication device and the second wireless communication device;
determine a time period to allow the second wireless communication device to use the wireless transmission medium based on the amount of data that the second wireless communication device is requesting to communicate; and
transmit from the first wireless communication device to the second wireless communication device an authorization to use the wireless transmission medium during the time period.

9. The system of claim 8, wherein the processing device, responsive to executing the instructions, further causes the system to:
transmit, by the first wireless communication device, a message to a fourth wireless communication device that indicates to the fourth wireless communication device to not transmit data to the first wireless communication device during the time period.

10. The system of claim 9, wherein the processing device, responsive to executing the instructions, further causes the system to:
extract, by the first wireless communication device, a transmit stop time from the timing data that indicates a point in time that the second wireless communication device will stop transmitting data; and
wherein the message to the fourth wireless communication device indicates to the fourth wireless communication device to not transmit data to the first wireless communication device after the transmit stop time.

11. The system of claim 10, wherein the processing device, responsive to executing the instructions, further causes the system to:
transmit another message to the fourth wireless communication device that indicates to the fourth wireless communication device that the first wireless communication device will not transmit data to the fourth wireless communication device until after the transmit stop time.

12. The system of claim 8, wherein the processing device, responsive to executing the instructions, further causes the system to:
    identify a time at which the first wireless communication device can pause communicating data over the wireless transmission medium; and
    determine the time period based on the time at which the first wireless communication device can pause communicating data over the wireless transmission medium.

13. The system of claim 8, wherein the processing device, responsive to executing the instructions, further causes the system to:
    receive a first indication at the first wireless communication device from the second wireless communication device that the second wireless communication device is using the wireless transmission medium;
    receive a second indication at the first wireless communication device from the second wireless communication device that the second wireless communication device has stopped using the wireless transmission medium; and
    in response to receiving the second indication, transmit data by the first wireless communication device over the wireless transmission medium.

14. The system of claim 8, wherein the amount of data corresponds to one or more frames of data, and wherein the timing data comprises an indication of whether the one or more frames of data are acknowledged, an indication of whether the one or more frames of data correspond to a long frame a short frame, and a periodicity at which the second wireless communication device will communicate the one or more frames of data.

15. A non-transitory computer readable medium, having instructions stored thereon which, when executed by a processing device, cause the processing device to:
    receive timing data at a first wireless communication device from a second wireless communication device, wherein the timing data that indicates an amount of data that the second wireless communication device is requesting to communicate to a third wireless communication device via a wireless transmission medium shared between the first wireless communication device and the second wireless communication device;
    determine a time period to allow the second wireless communication device to use the wireless transmission medium based on the amount of data that the second wireless communication device is requesting to communicate; and
    transmit from the first wireless communication device to the second wireless communication device an authorization to use the wireless transmission medium during the time period.

16. The non-transitory computer readable medium of claim 15, wherein the processing device is to:
    transmit, by the first wireless communication device, a message to a fourth wireless communication device that indicates to the fourth wireless communication device to not transmit data to the first wireless communication device during the time period.

17. The non-transitory computer readable medium of claim 16, wherein the processing device is to:
    extract, by the first wireless communication device, a transmit stop time from the timing data that indicates a point in time that the second wireless communication device will stop transmitting data; and
    wherein the message to the fourth wireless communication device indicates to the fourth wireless communication device to not transmit data to the first wireless communication device after the transmit stop time.

18. The non-transitory computer readable medium of claim 17, wherein the processing device is to:
    transmit another message to the fourth wireless communication device that indicates to the fourth wireless communication device that the first wireless communication device will not transmit data to the fourth wireless communication device until after the transmit stop time.

19. The non-transitory computer readable medium of claim 15, wherein the processing device is to:
    identify a time at which the first wireless communication device can pause communicating data over the wireless transmission medium; and
    determine the time period based on the time at which the first wireless communication device can pause communicating data over the wireless transmission medium.

20. The non-transitory computer readable medium of claim 15, wherein the processing device is to:
    receive a first indication at the first wireless communication device from the second wireless communication device that the second wireless communication device is using the wireless transmission medium;
    receive a second indication at the first wireless communication device from the second wireless communication device that the second wireless communication device has stopped using the wireless transmission medium; and
    in response to receiving the second indication, transmit data by the first wireless communication device over the wireless transmission medium.

* * * * *